United States Patent [19]
Klein et al.

[54] BROAD SPECTRUM SELENIUM ION LASER

[72] Inventors: Marvin Bertrand Klein, Long Branch; William Thomas Silfvast, Holmdel Township, Monmouth County, both of N.J.

[73] Assignee: Bell Telephone Laboratories, Incorporated, Murray Hill, N.J.

[22] Filed: June 25, 1971

[21] Appl. No.: 156,609

Related U.S. Application Data

[63] Continuation-in-part of Ser. No. 68,991, Sept. 2, 1970, abandoned.

[52] U.S. Cl. .................................. 331/94.5, 250/199
[51] Int. Cl. ........................... H01s 3/22, H01s 3/05
[58] Field of Search ...................... 31/94.5; 250/199

[56] References Cited

OTHER PUBLICATIONS

Bell, IEEE Journal of Quantum Electronics, Vol. QE-1, p. 400 (1965).
Bennett, Jr., Atomic Physics, (Proc. of 1st Int' L. Conf. on Atomic Physics, N.Y.C. 1968) Plenum Pross. (Jan. 21, 1969), pp. 465–473.
Herzberg, Atomic Spectral Atomic Structure, Dover Pub's. 1944, pp. 140–141.

Primary Examiner—Ronald L. Wibert
Assistant Examiner—R. J. Webster
Attorney—R. J. Guenther and Arthur J. Torsiglieri

[57] ABSTRACT

There is disclosed the discovery of a selenium ion laser employing a relatively low current, cataphoresis ion-pumped discharge tube in which a broad spectrum of infrared and visible laser lines (approximately 46) from near-infrared to blue oscillate in a continuous-wave manner in a mixture of helium gas at a pressure of several Torr and selenium vapor supplied from a reservoir of solid selenium heated to a temperature between 200°C and 300°C.

10 Claims, 6 Drawing Figures

BROAD SPECTRUM SELENIUM ION LASER

CROSS-REFERENCE TO RELATED APPLICATION

This application is a continuation-in-part of our copending U.S. Pat. application, Ser. No. 68,991, filed Sept. 2, 1970 now abandoned and assigned to the assignee hereof.

BACKGROUND OF THE INVENTION

This invention relates to ion lasers employing active media in the form of vapors supplied from heated elemental material.

It has been previously recognized that elements that naturally occur in solid or liquid form, such as most of the metals, are the most likely source of new ion lasers. New ion lasers are needed because the noble gas ion lasers fail to provide enough different frequencies to cover all of the visible portion of the spectrum for purposes of spectroscopy or communication. Also, the noble gas ion lasers are relatively inefficient and expensive.

Certain solid elements other than those commonly known as metals have also been employed in pulsed ion lasers at very low vapor pressures. For example, selenium, arsenic and bromine ion lasers excited in pulsed RF ring discharges are disclosed in the article by W. E. Bell et al., IEEE Journal of Quantum Electronics, Vol. 1, p. 400 (1965). These lasers typically operated at an optimum neon buffer gas pressure of the order of 100 millitorr (where 1 millitorr equals (1/760,000) × 1 atmosphere). The relatively few laser oscillations observed were pulsed oscillations.

In fact, only a few metal vapor ion lasers or other vapor ion lasers obtained from heated solids or liquids have been successfully operated in a continuous-wave manner. Most of these have employed the Penning-collision mechanism disclosed in the copending patent application of one of us, W. T. Silfvast, Ser. No. 819,859, filed Apr. 28, 1969. That technique permits total vapor pressures in the laser of the order of 1,000 times greater than in most other vapor ion lasers.

Nevertheless, that technique is limited to use with those elements having an upper laser level lying lower in energy than a metastable level of one of the noble gases such as helium (metastable energies equal to about 19 electron volts).

SUMMARY OF THE INVENTION

We have discovered a broad spectrum of infrared and visible laser transitions (46 so far, distributed remarkably well throughout the visible and near infrared regions of the spectrum) that oscillate in a continuous-wave manner in a relatively low current, cataphoresis ion-pumped discharge tube. The oscillations are obtained in a mixture of helium gas at pressures exceeding one Torr and selenium vapor obtained from solid elemental selenium heated to a temperature between 200° and 300° C. Nineteen of the transitions from 4,605 Angstroms to 6,444 angstroms in the visible region oscillate simultaneously in one configuration having broadband reflectors. Output powers varying from 3 to 5 milliwatts have been measured over the spectral range from 4,467 to 12,600 A (1.26 micrometers) using various combinations of laser mirrors. One combination of mirrors has produced a combined power output of 250 milliwatts on the six strongest blue-green transitions.

According to a feature of our invention, a wide variety of configurations of the laser tube may be employed without deleterious effect on the laser oscillations. For example, in the configuration in which our discovery was first made, helium was flowed transversely through the tube at two locations at points along the tube axis between the end windows at the limits of the active discharge. While this configuration did not provide substantial flow of the mixture of gases in the discharge region, it can readily provide such a continuous flow. On the other hand, a completely sealed tube embodiment has been successfully operated in a longer tube in which the same lines were obtained at somewhat greater power levels.

According to other features of our invention, the optimum selenium vapor pressure is obtained at reservoir temperatures between about 250° and 280°C. Optimum helium pressures were in the range between about 5 and 15 Torr. The maximum total power to date has been obtained at a discharge current of 400–500 milliamperes.

The infrared transitions have significance for integrated optical circuits and for future optical communication systems because of their compatibility with previously-developed optical devices.

BRIEF DESCRIPTION OF THE DRAWING

Further features and advantages of the invention will become apparent from the following detailed description, taken together with the drawing, in which.

DETAILED DESCRIPTION

We have observed CW laser action on 46 transitions in the visible spectrum of singly-ionized selenium (Se II) in a helium-selenium discharge. The laser wavelengths range from 4,467 to 12,600 angstroms with as many as 19 transitions lasing simultaneously in a cavity having broadband high-reflecting mirrors. The variety of wavelengths occurring in the infrared and over most of the visible spectrum and the operation in a relatively low current, cataphoresis ion-pumped discharge tube, make this an attractive laser for a number of applications.

Pulsed laser action on two of the observed transitions (5,097 and 5,227 A) was reported previously by Bell et al. (cited above) under quite different discharge conditions. They excited the vapor in pulsed RF ring discharges using various noble gases as buffer gases. Their optimum buffer gas pressure was 100 millitorr with neon giving the best output. The 5,227 A transition corresponds to one of our strongest CW transitions while the 5,097 A transition is one of the weakest. This apparent inconsistency indicates that we have discovered a new laser having a new mechanism of operation.

Several different types of discharge tubes were used in these studies. We shall describe each tube and its operation in sequence.

Figure 1:
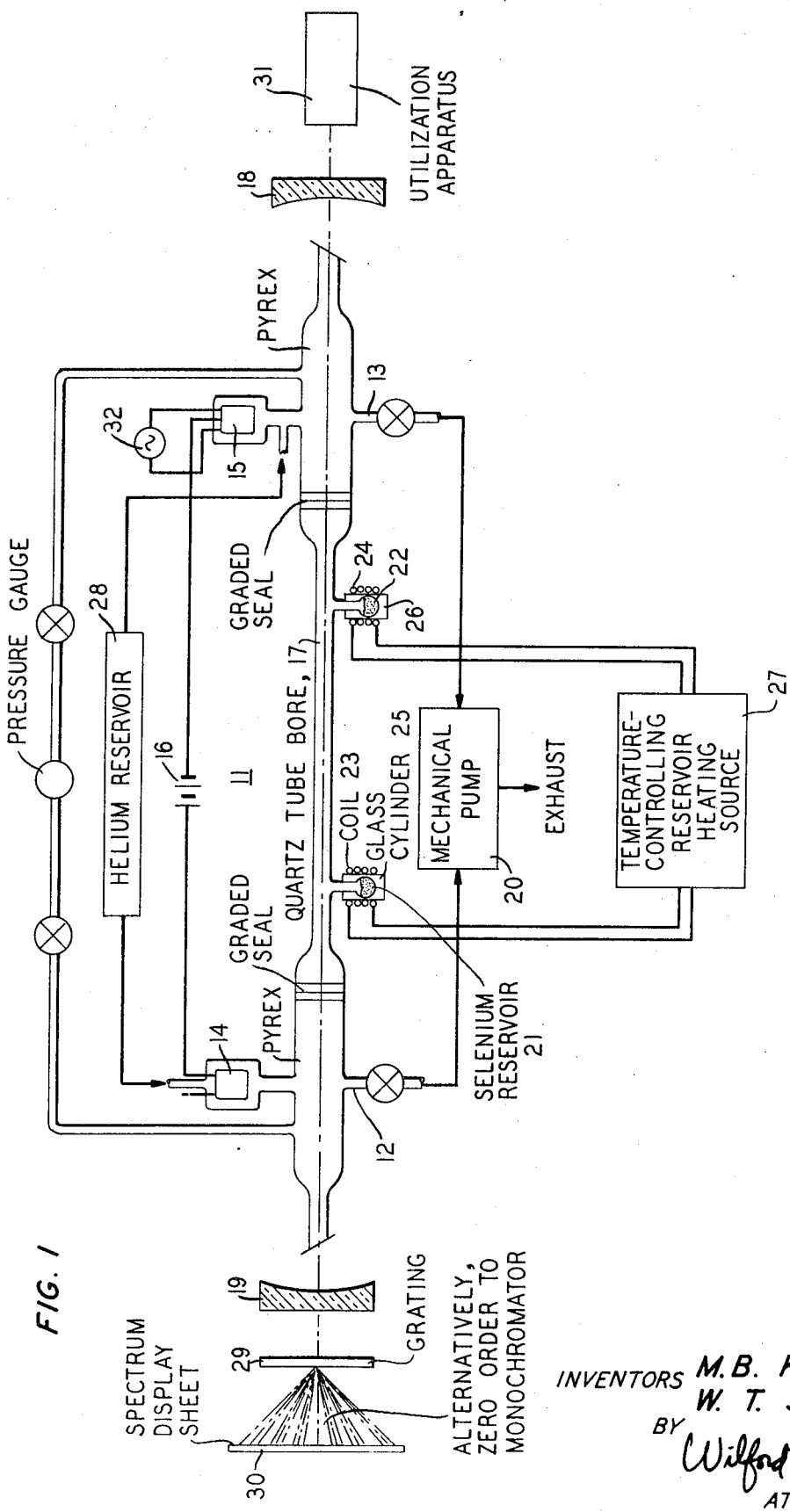
FIG. 1 is a partially pictorial and partially block diagrammatic illustration of a first embodiment of the invention employing transverse helium flow.

In our initial discovery, and for relatively high currents, we used a 3 mm (internal diameter) bore, 50 cm long quartz tube 11, as shown in FIG. 1, capable of discharge currents as high as 1 ampere, supplied between anode 14 and cathode 15 by dc source 16. This tube contained sidearms 12 and 13 aligned with the anode and cathode sidearms beyond the ends of the bore region 17 to obtain a better control of the vapor pressure at high discharge currents. Specifically, helium gas was flowed from a reservoir 28 through suitable inlet ports of the sidearms containing anode 14 and cathode 15, respectively, and exhausted through the aligned sidearms 12 and 13 by the mechanical pump 20. It is found that this transverse helium flow helps to support the discharge and protect the windows. The discharge current provided enough heat to maintain the bore region 17 at a higher temperature than the reservoirs 21 and 22 in order to prevent condensation of the selenium in the bore.

The selenium vapor is provided from solid elemental selenium in the reservoirs 21 and 22, which open into the tube bore 17. The reservoirs 21 and 22 are 5 centimeters deep, bulb-shaped at the bottom, and are 3 millimeters in diameter at their opening into the tube bore. They are located 4 centimeters from the flared regions of the quartz tube 11 and are heated by resistance heating coils 23 and 24 surrounding the hollow glass cylinders 25 and 26 that space them from reservoirs 21 and 22. Optionally, coils 23 and 24 may be exteriorly insulated (by means not shown) to reduce total power consumption.

The temperature of reservoirs 21 and 22, and hence, the vapor pressure of selenium, is controlled by the excitation supplied by heating source 27. While we typically adjusted the excitation from source 27 manually, it could also be done in response to suitable feedback from reservoirs 21 and 22. Thermocouples attached to the reservoirs could provide the feedback signals.

The optimum partial pressures of the two gases were approximately 6 to 8 Torr He and $5 \times 10^{-3}$ Torr Se. Nevertheless, nearly optimum conditions can be provided over wider ranges of vapor pressures, as described hereinafter. All of the transitions are believed to originate from the $4s^2 4p^2 5p$ excited electronic configuration in singly ionized selenium (Se II). This electronic configuration is energetically close to the He ion ground state. That is, its energy nearly matches the energy of the helium ion ground state.

In our initial experimental embodiment, the back reflector 19 of FIG. 1 was partially transmissive to permit a portion of the resonated radiation to be extracted for display by grating 29 in various diffracted orders upon a display sheet 30. In the first diffracted order and higher diffracted orders the different colors are separated enough to be distinguished by the eye. Since the different colors in the zero-order beam are not separated, this beam was optionally passed to a monochromator or spectrometer for precise wavelength measurement.

In addition, the front reflector was partially transmissive to permit extraction of another fraction of the resonated radiation. For example, this radiation can be utilized in an apparatus 31, such as an apparatus for determining the Raman spectroscopic properties of a crystal through the band of frequencies covered by the laser lines.

Coherency of the radiation extracted can be tested by a slight tilting or detuning of either one of the end reflectors 18 and 19.

The flared regions of tube 11, as well as the associated sidearms, were of Pyrex joined to the quartz bore 17 by graded seals. The flared regions were of 2.5 centimeter internal diameter; and the regions near the end windows were of one-half (½) inch internal diameter.

In the operation of the embodiment of FIG. 1, the helium pressure is adequate, more than 2 Torr, and preferably 5–15 Torr, to obtain the new, beneficial mechanism of operation of a selenium ion laser. We have found that cataphoresis, the movement of positive ions under the influence of the dc field, is a prominent feature of the laser of FIG. 1. The intensity of the output decreases only marginally when the right-hand reservoir 22 is not heated. Therefore, selenium ions are readily distributed by cataphoresis along the tube from reservoir 21. The positive selenium ions are said to be pumped from reservoir 21 near the anode toward the cathode by cataphoresis. For brevity, the laser is characterized as having a cataphoresis ion-pumped discharge tube.

The 24 visible laser transitions obtained in the 50 centimeter tube 11 are listed in table I, below. All wavelengths were measured with a Spex ¾ meter spectrometer and are identified as resulting from known transitions in the spectrum of singly ionized selenium (Se II).

Figure 3:
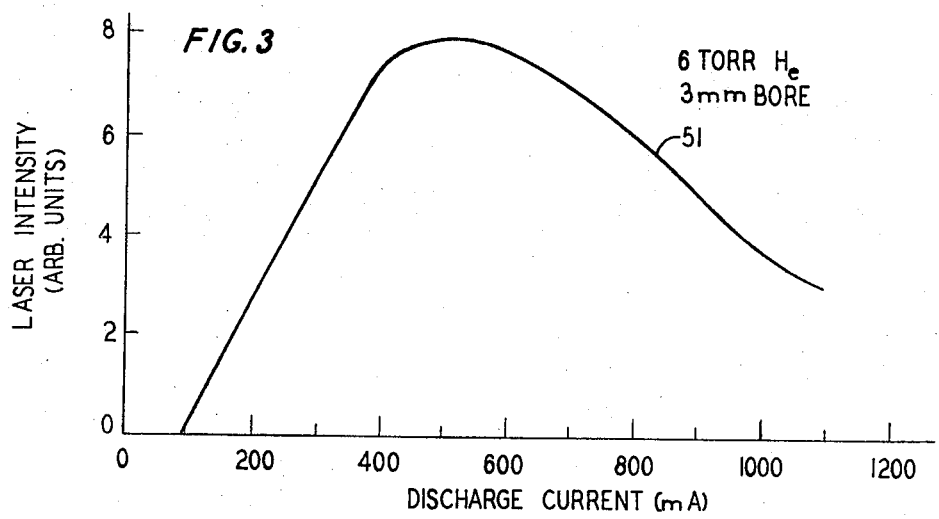
FIG. 3 is a curve showing the relationship of relative power and discharge current for the laser of FIG. 1.

The variation of laser power with current of the strongest transition at 5,227 A is shown in FIG. 3 for the 3 mm bore-50 cm discharge tube of FIG. 1. The power increases approximately linearly with current until it begins to saturate at 400 mA. It peaks at 500 mA and then falls off to one-third of the maximum at a current of 1 amp. A threshold current of 40 mA was observed for the 5,227 A transition in the 1-meter discharge.

The gain for each transition is listed in table I, below, for the 4 mm bore discharge of FIG. 2 at a current of 200 mA. Nevertheless, the gain/meter was higher on most transitions in the 3 mm bore tube of FIG. 1 than in the Pyrex tube of FIG. 2. The quartz bore 17 of FIG. 1 also could safely tolerate higher currents than that of FIG. 2. The maximum gain, as measured in the embodiment of FIG. 2, was 11%/meter on the 5,227 A transition at a current of 500 mA.

Figure 2:
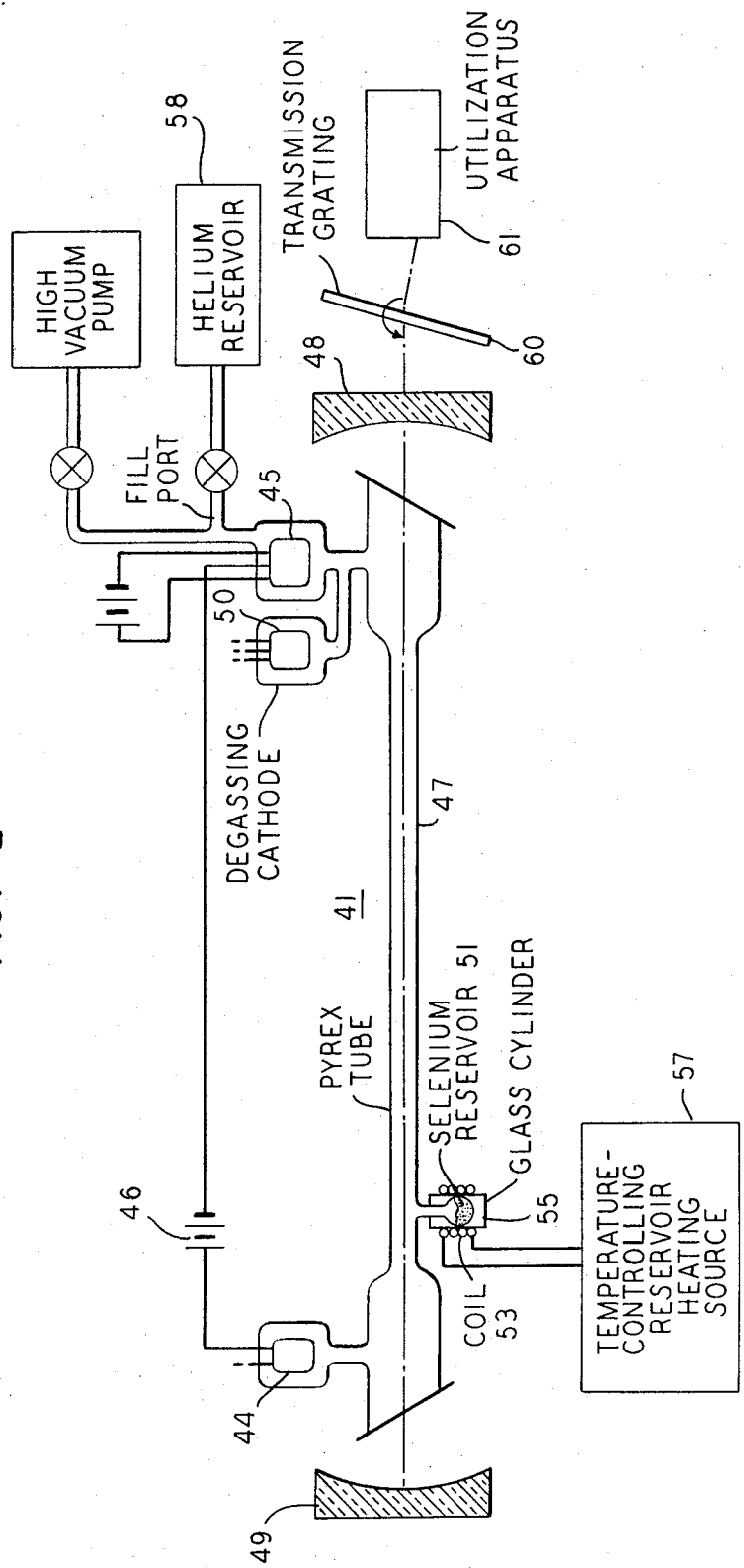
FIG. 2 is a partially pictorial and partially block diagrammatic illustration of a second embodiment of the invention employing a sealed laser tube.

The relative intensities of all lines are listed in table I as strong, moderate and weak, as they were observed in the configuration of FIG. 2 having a 4 mm bore and one meter discharge at a He pressure of 8 Torr and a discharge current of 200 mA.

TABLE I. WAVELENGTHS AND LEVEL ASSIGNMENTS

| Measured Wavelength (A) (accuracy ±0.5 A) | Actual Wavelength (A) | Level Assignment | Relative Intensity | Measured Gain C%/meter |
|---|---|---|---|---|
| 4604.6 | 4604.34 | $5p\ ^2D_{5/2} \rightarrow 5s\ ^4P_{5/2}$ | Moderate | — |
| 4648.6 | 4648.44 | $5p\ ^4P_{3/2} \rightarrow 5s\ ^4P_{1/2}$ | Weak | — |
| 4764.1 | 4763.65 | $5p\ ^2D_{3/2} \rightarrow 5s\ ^4P_{3/2}$ | Weak | — |
| 4840.6 | 4840.63 | $5p\ ^2S_{1/2} \rightarrow 5s\ ^4P_{3/2}$ | Weak | — |
| 4845.0 | 4844.96 | $5p\ ^4S_{3/2} \rightarrow 5S\ ^4P_{5\ 2}$ | Moderate | 2.3 |
| 4976.1 | 4975.66 | $5p\ ^2D_{5/2} \rightarrow 4s4p^4\ ^2P_{3/2}$ | Strong | 3.3 |
| 4992.9 | 4992.75 | $5p\ ^4P_{3/2} \rightarrow 5s\ ^4P_{3/2}$ | Strong | 3.3 |
| 5068.7 | 5068.65 | $5p\ ^4P_{5/2} \rightarrow 5s\ ^4P_{5/2}$ a | Strong | 3.3 |
| 5096.1 | 5096.50 | $5p\ ^4D_{7/2} \rightarrow 4d\ ^4F_{9/2}$ | Weak | — |
| 5141.9 | 5142.14 | $5p\ ^4D_{3/2} \rightarrow 5s\ ^4P_{1/2}$ | Moderate | 1.3 |
| 5176.0 | 5175.98 | $5p\ ^4D_{5/2} \rightarrow 5s\ ^4P_{3/2}$ | Strong | 4.6 |
| 5227.6 | 5227.51 | $5p\ ^4D_{7/2} \rightarrow 5s\ ^4P_{5/2}$ | Strong | 5.4 |
| 5252.6 | 5253.07 | $5p\ ^2D_{5/2} \rightarrow 5s\ ^2P_{3/2}$ | Moderate | 1.7 |
| 5253.2 | 5253.63 | $5p\ ^4D_{1/2} \rightarrow 5s\ ^4P_{1/2}$ | Moderate | 1.7 |
| 5271.3 | 5271.11 | $5p\ ^4D_{5/2} \rightarrow 4d\ ^4F_{7/2}$ | Weak | — |
| 5305.5 | 5305.35 | $5p\ ^2D_{3/2} \rightarrow 5s\ ^2P_{1/2}$ | Strong | 2.6 |
| 5522.8 | 5522.42 | $5p\ ^4P_{3/2} \rightarrow 5s\ ^4P_{5/2}$ a | Moderate | — |
|  |  | $5p\ ^4P_{5/2} \rightarrow 4s4p^4\ ^2P_{3/2}$ |  |  |
| 5591.6 | 5591.16 | $5p\ ^4P_{3/2} \rightarrow 5s\ ^2P_{1/2}$ | Weak | — |
| 5697.9 | 5697.88 | $5p\ ^4D_{1/2} \rightarrow 5s\ ^4P_{3/2}$ | Weak | — |
| 5747.9 | 5747.62 | $5p\ ^4D_{5/2} \rightarrow 5s\ ^4P_{5/2}$ | Weak | — |
| 6056.3 | 6055.96 | $5p\ ^2P_{3/2} \rightarrow 7$ | Moderate | 1.3 |
| 6443.9 | 6444.25 | $5p\ ^2D_{5/2} \rightarrow 7$ | Moderate | — |
| 6490.1 | 6490.48 | $5p\ ^4D_{1/2} \rightarrow 5s\ ^2P_{1/2}$ | Moderate | — |
| 6534.6 | 6534.95 | $5p\ ^2P_{1/2} \rightarrow 9$ | Weak | — | a Assignment in doubt.

In FIG. 2, the sealed discharge tube configuration is adapted more completely for the cataphoresis-pumping of selenium ions than is the configuration of FIG. 1.

The all-Pyrex tube 41 has a bore region 47 of 4 millimeters internal diameter and 1 meter length and flared regions near the end windows of 12 millimeters internal diameter. The Brewster's angle of the quartz end windows was selected for a wavelength of about 442 nanometers in the blue, although these windows thereby also provide very low loss for the lines of longer wavelength, even the red lines.

The selenium reservoir 51 is spaced 2 centimeters axially along the discharge from the sidearm containing anode 45 and otherwise is arranged and heated as in the embodiment of FIG. 1. Uniform selenium vapor distribution in the bore was maintained by the cataphoresis ion-pumping by the dc discharge. Again, heat from the discharge prevented selenium condensation in the bore 47.

A separate cathode 50 in a separate sidearm was substituted for the main cathode 45 to supply the discharge during degassing and thereby preserve the main cathode from degradation. The tube was then filled with 8 Torr of helium from reservoir 58; and then the stopcock was closed. Thus, the laser of FIG. 2 operated with a sealed discharge tube. Under these conditions a total power of 30 mW was obtained in nearly equal amounts from the 4,976 A, 4,993 A, 5,069 A, 5,176 A, 5,227 A and 5,305 A transitions (blue-green to yellow-green) using an output mirror 48 having 2–3 percent transmission over this wavelength range. This output mirror 48 was not optimized for these transitions and we believe that higher powers could be obtained with a suitable degree of output coupling. We also obtained a power of 1.2 mW at 4,605 A and 0.3 mW at 4,649 A with an output mirror 48, shown in FIG. 2, having 0.7 percent transmission for these wavelengths. We observed some competition among some of the lines and thus a prism selector (not shown) in the laser resonator would be necessary to obtain maximum power on every transition. In practical application, a rotatable transmission grating 60 could be used when many lines are oscillating to select one for transmission to utilization apparatus 61. In particular, grating 60 is readily used to promote the oscillation of a selected infrared wavelength.

Figure 4:
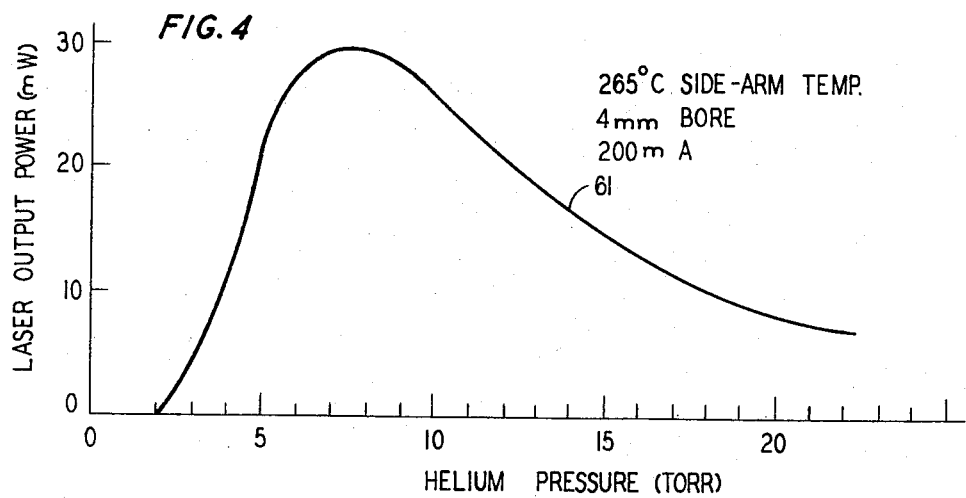
FIGS. 4 and 5 show typical variations of laser power with He pressure and sidearm temperature, respectively, for the embodiment of FIG. 2.
Figure 5:
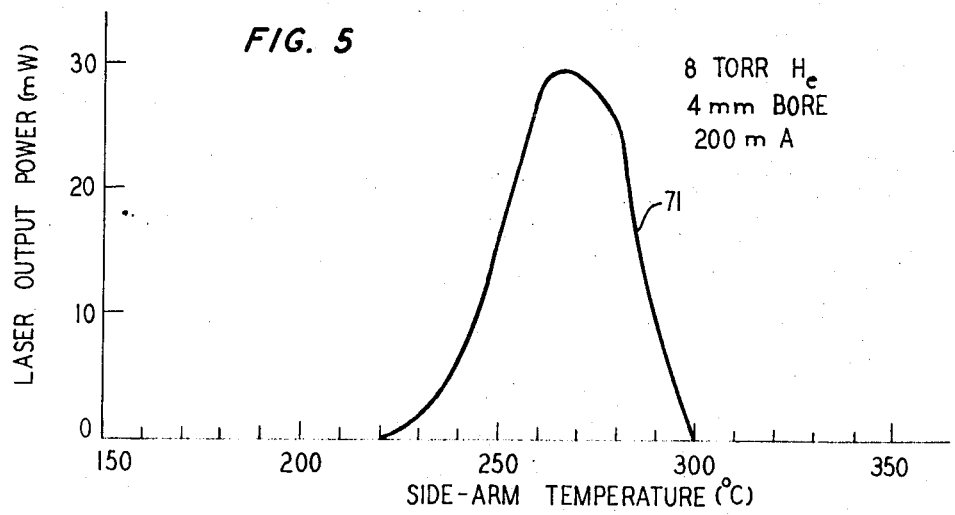

FIGS. 4 and 5 show the variation of laser power with He pressure and sidearm temperature for the 4 mm bore discharge of FIG. 2 at a current of 200 mA. The output consisted of the six lines mentioned previously using the 2–3 percent output mirror 48. The variation with helium pressure in FIG. 4 at a sidearm temperature of 265° C. has a rather broad maximum over the region from 6 to 10 Torr. The low pressure threshold is at 2 Torr and laser action was observed at pressures as high as 22 Torr. (Pressures higher than this were not investigated.) The 3 mm bore tube showed a similar pressure variation with an optimum at 6 Torr.

The variation with sidearm temperature is shown in FIG. 5 at a helium pressure of 8 Torr. The half-width of the curve occurs over a temperature range of approximately 30° C. with the maximum occurring at 265°C. This latter temperature was estimated to correspond to a vapor pressure of approximately $5 \times 10^{-3}$ Torr allowing for an increased temperature necessary to compensate for the cataphoresis effects in the bore region. The narrow vapor pressure region over which laser action occurs is characterized by a relatively white discharge. This discharge is contrasted with the pinkish discharge associated with pure helium on the low temperature side and the blue discharge of selenium on the high temperature side.

The upper laser levels, which include all of the thirteen 5p levels, for these transitions all result from the $4s^24p^25p$ electronic configuration in the spectrum of singly ionized selenium (Se II). All of these levels lie close to the helium ion ground state. Only three levels lie above it (within about 0.2 eV) with a maximum energy discrepancy of $\approx 4$ kT. This very close energy match along with the linear current dependence and the high helium pressure for optimum output indicate the possibility that the levels are excited by charge exchange collisions between the helium ions and neutral ground state selenium atoms. We believe that our discharges in every case were effective to ionize a significant portion of the helium, which we estimate to be about 0.01 percent or more of the helium atoms. If electron collisions were responsible for the excitation of the levels, the optimum helium pressure would be much lower (providing a higher electron temperature) corresponding to the conditions reported by Bell et al. Also laser action did not occur in similar mixtures of Ar-Se. This observation is consistent with the fact that there is no energy coincidence between the argon ion levels and the 5p selenium ion levels.

Selenium vapor is believed to exist in the form of $Se_2$, $Se_4$, $Se_6$ and $SE_8$ molecules although the relative concentrations of the various forms are not accurately known. The dissociation energy of $Se_2$ is 3.55 eV and therefore the dissociation process is probably due to collision of Se molecules with either electrons and/or helium metastables or ions. Thus, it is also possible that molecules are being dissociated and left in an excited ionic state. Nevertheless, electrons would be the only species with enough energy to do this and the optimum laser output would then occur at a much lower helium pressure. In view of the latter consideration, charge-transfer ionization of single selenium atoms may play the major role.

In a preferred modification of the embodiment of FIG. 1, a 2-meter long quartz tube 11 was employed and facilitated our discovery of the 22 new transitions in singly-ionized selenium. The modified discharge tube had a centrally mounted cathode and an anode at each end. Broad-band reflectors of improved infrared reflectivity were employed. We also found that the optimum current levels were somewhat lower when the helium flow was stopped and the tube sealed off.

The data of table II, below, were observed in such a two-meter tube of 3 millimeter internal diameter. In addition, in such a tube, at optimum discharge conditions, we have measured a combined power of 250 milliwatts at 4,976.1 A, 4,992.9 A, 5,068.7 A, 5,176.0 A, 5,227.6 A and 5,305.5 A using an output mirror with an average transmission of 3 percent. Powers as high as 50 milliwatts have been measured at 5,068.7 A, 5,176 A and 5,227.6 A.

Table II, which follows, is organized in the same way as table I above. Included in table II are the 22 new laser transitions obtained in our recent experiments.

TABLE II. WAVELENGTHS AND LEVEL ASSIGNMENTS

| Measured Wavelength (A) | Actual Wavelength (A) | Level Assignment | Relative Intensity | Measured (%/M) |
|---|---|---|---|---|
| 4468.0 | 4467.60 | $5p\ ^2P_{1/2} \rightarrow 5s\ ^2P_{1/2}$ | Moderate | 1.4 |
| 4619.1 | 4618.77 | $5p\ ^4P_{5/2} \rightarrow 5s\ ^4P_{3/2}$ | Weak | < 1.0 |
| 4718.5 | 4718.23 | $5p\ ^4S_{3/2} \rightarrow 3$ | Weak | < 1.0 |
| 4740.6 | 4740.97 | $5p\ ^2P_{3/2} \rightarrow 4s\ 4p^4\ ^2P_{3/2}$ | Weak | < 1.0 |
| 4765.1 | 4765.52 | $5p\ ^2P_{1/2} \rightarrow 5s\ ^2P_{3/2}$ | Moderate | 106 |
| 5567.1 | 5566.93 | $5p\ ^4D_{3/2} \rightarrow 5s\ ^4P_{3/2}$ | Weak | < 1.0 |
| 5622.8 | 5623.13 | $5p\ ^4P_{1/2} \rightarrow 5s\ ^4P_{1/2}$ | Weak | < 1.0 |
| 5842.8 | 5842.68 | $5p\ ^2S_{1/2} \rightarrow 5s\ ^2P_{3/2}$ | Moderate | 1.6 |
| 5866.7 | 5866.27 | $5p\ ^4P_{5/2} \rightarrow 5s\ ^2P_{3/2}$ | Moderate | 1.6 |
| 6066.1 | 6065.83 | $5p\ ^4P_{3/2} \rightarrow 5s\ ^2P_{3/2}$ | Moderate | 1.6 |
| 6102.1 | 6101.96 | $5p^2D_{3/2} \rightarrow 5s\ ^2P_{3/2}$ | Weak | < 1.0 |
| 7064.2 | 7063.89 | $5p\ ^4P_{1/2} \rightarrow 5s\ 2P_{1/2}$ | Moderate | 1.8 |
| 7392.4 | 7391.99 | $5p\ ^4P_{5/2} \rightarrow 7$ | Moderate | 1.4 |
| 7674.9 | 7674.82 | $5p\ ^2P_{3/2} \rightarrow 5s''\ ^2D_{5/2}$ | Weak | 1.0 |
| 7723.6 | 7724.04 | $5p\ ^4D_{1/2} \rightarrow 5s\ ^2P_{3/2}$ | MOderate | 1.1 |
| 7796.2 | 7796.15 | $5p\ ^2P_{1/2} \rightarrow 5s\ ''\ ^2D_{3/2}$ | Moderate | 1.3 |
| 7839.3 | 7838.81 | $5p\ ^4P_{1/2} \rightarrow 5s\ ^2P_{3/2}$ | Moderate | 1.9 |
| 8308.9 | 8309.52 | $5p\ ^2D_{3/2} \rightarrow 5s''\ ^2D_{5/2}$ | Moderate | 1.9 |
| 9249.3 | — | — | Weak | < 1.0 |
| 9954.7 | 9955.15 | $5p\ ^4P_{5/2} \rightarrow 5s''\ ^2D_{5/2}$ | Moderate | 1.1 |
| 10409.7 | 10408.81 | $5p\ ^4D_{1/2} \rightarrow 6$ | Strong | 2.8 |
| 12587.9 | 12586.78 | $5p\ ^4P_{3/2} \rightarrow 10$ | Strong | 4.3 |

Since we do not observe that excitation preferentially excites those 5p levels lying closest in energy to the He + ground state, we believe that mixing collisions with electrons or He atoms plays an important role in distributing the initial charge transfer excitation among the 5p levels. It is expected that the cross sections for these collisions will be large because the average energy separation among the levels is ≈kT in our discharge.

Figure 6:
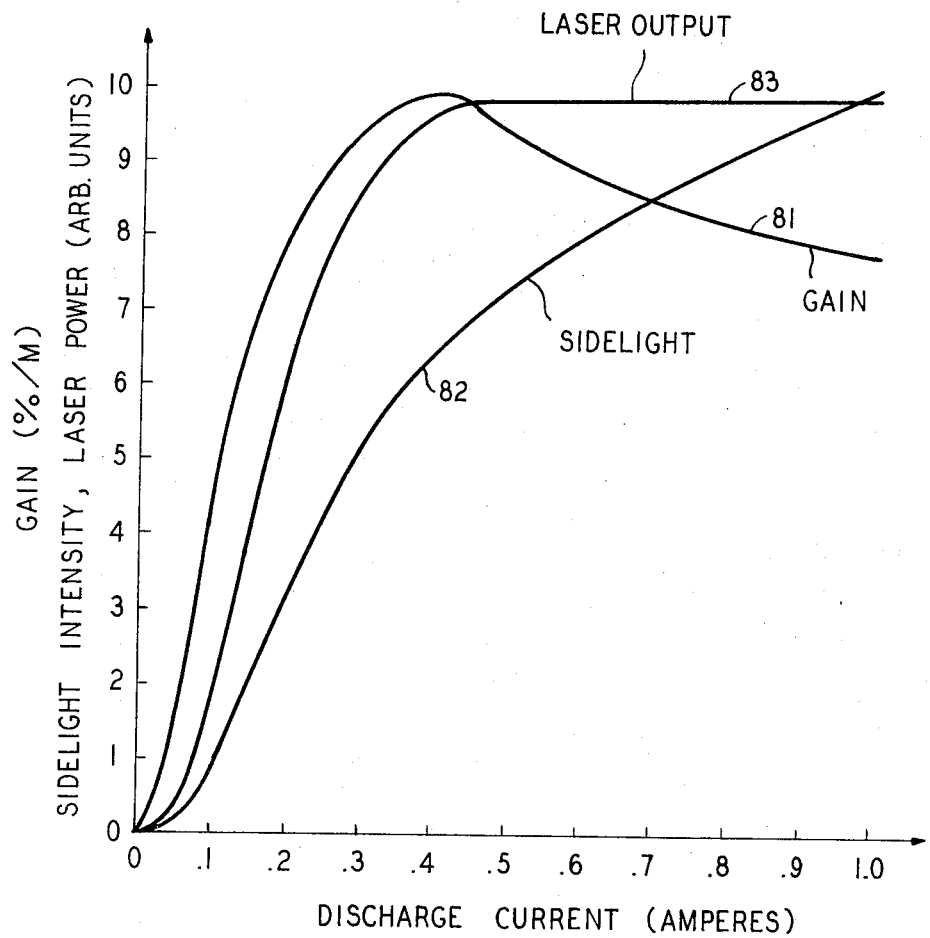
FIG. 6 shows typical variations of laser gain, sidelight and power with discharge current for a modified embodiment of FIG. 1.

In our earlier work, we observed a saturation in laser power as the discharge current was increased above an optimum value. In order to obtain more information regarding this behavior, we have measured the variation of gain, upper laser level spontaneous emission (sidelight) and laser power as a function of current in our tube on several of the strong transitions. This data is shown in FIG. 6 in curves 81, 82 and 83, respectively, for the transition at 5,227 A. (All of the other transitions examined behaved similarly.) Both the gain and the laser intensity reach a maximum at approximately 400 mA. The sidelight emission on the other hand continues to increase with current (to the highest currents measured). It increases faster than linearly up to approximately 75 mA, linearly from 75 to 300 mA and sublinearly at higher currents. The rapid variation at low currents is attributed to cataphoresis effects and to the collisional dissociation of Se molecules. The linear variation at moderate currents is consistent with charge transfer excitation from He ions. At higher currents, the positive charge density should still be increasing linearly but Se ions are becoming a significant fraction of the total ion density, thus reducing the rate of increase of He+ to a sublinear variation. Also, cataphoresis may reduce the Se density at higher currents as the selenium transport velocity increases. Both of these effects are consistent with our observations of the upper laser level sidelight variation.

The saturation in the laser intensity and gain (which begins at approximately 150 mA), contrasted with the continued increase in sidelight, could be explained by either a rapid buildup in the lower level population or an increase in the laser bandwidth at higher currents. We have measured a small increase in the width of the laser frequency spectrum (10–15 percent) at high currents but this increase is not large enough to account for the significant difference between the gain and the upper level variations. We therefore conclude that it must be due to a large increase in the lower level population.

There are at least two possible explanations for this large increase in the population of the lower laser levels at higher currents. First, these levels may be significantly populated by direct electron collisions. In this case, the populations would vary anywhere from linearly to quadiatically with current depending upon the relative extent of a one-step or a two-step process. This is compared with the measured sublinear variation of the upper laser levels and would account for the decrease in gain. Second, the radiative lifetime of the lower laser levels could be increased by radiation trapping. The radiative transitions from the lower laser levels all terminate on selenium ion ground state levels whose populations are increasing as the current is increased. Estimates of the Se ion ground state densities and decay rates on these transitions indicate that resonance trapping could be a significant factor in the buildup of the lower laser level populations. This population increase would be greater than linear with current and could also account for the observed decrease in gain at higher currents. Our present data does not allow us to determine the relative importance of these two processes at this time.

A nice feature of the laser output is the relatively low noise as compared with the helium-cadmium laser on all of the transitions that were above threshold. We believe the low noise is due to a rather stable population of helium ions in the discharge.

In conclusion, we believe that the He-Se laser will be a useful laser covering a major portion of the near infrared and visible spectrum. Powers in the range of 5–100 mW per line over most of the spectrum should be obtainable with longer discharge tubes and optimized output coupling. The use of inexpensive He-Cd type discharge tubes should simplify construction and provide for long life operation. The low noise and stable operation in a cataphoresis ion-pumped system are also important features of this system.

We claim:

1. A laser of the type in which a discharge is supplied in a mixture of helium gas and selenium vapor to enable the stimulated emission of coherent radiation, said laser being characterized in that said selenium vapor is supplied from a reservoir at a temperature between about 200° and 300° C., said helium gas is present in the mixture within an active region at a pressure greater than about 2 Torr, and included within the laser are means for supplying a continuous direct-current discharge as said discharge in said mixture within said active region, and means for stimulating the emission of coherent radiation over a selected frequency band in the visible and near infrared bands, throughout which said laser is capable of stimulated emission.

2. A laser according to claim 1 in which the means for supplying a discharge is effective to ionize a significant portion of the helium in the mixture.

3. A laser according to claim 1 in which the helium-supplying means supplies helium at a pressure between 5 and 15 Torr in the mixture with selenium vapor.

4. A laser according to claim 1 in which the means for supplying selenium vapor provides a selenium vapor temperature between 250° and 280° C., and the means for supplying helium supplies helium in the mixture with selenium at a partial pressure between about 6 and 8 Torr.

5. A laser comprising
means for containing a mixture of gases,
means for supplying selenium vapor within said containing means at a temperature between about 200° and 300° C.,
means for supplying helium in a mixture with said selenium vapor at a pressure in excess of about 2 Torr,
means for supplying a direct-current discharge through said mixture continuously, and
means for stimulating the emission of continuous-wave coherent radiation from said mixture at a selected frequency in the near infrared and visible regions of the spectrum.

6. A laser according to claim 5 in which the discharge supplying means includes an anode and a cathode between which the discharge occurs and said containing means includes a reservoir for elemental selenium nearer to the anode than to the cathode, said means for supplying a direct-current discharge being effective to pump selenium ions along the direction of the discharge toward the cathode by cataphoresis.

7. A laser according to claim 5 in which the means for supplying a discharge is effective to pump selenium ions along the discharge by cataphoresis.

8. A laser according to claim 5 in which the helium-supplying means supplies helium at a pressure between 5 and 15 Torr in the mixture with selenium vapor.

9. A laser according to claim 5 in which the means for supplying selenium vapor provides a selenium vapor temperature between 250° and 280° C., and the means for supplying helium supplies helium in the mixture with selenium at a partial pressure between about 6 and 8 Torr.

10. A laser according to claim 5 in which the containing means and stimulating means include means for selecting an infrared frequency of the coherent radiation.

* * * * *